(12) United States Patent
Ozawa

(10) Patent No.: US 6,239,912 B1
(45) Date of Patent: May 29, 2001

(54) FOCAL POINT DETECTION APPARATUS

(75) Inventor: Masamitsu Ozawa, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/391,365

(22) Filed: Sep. 8, 1999

(30) Foreign Application Priority Data

Sep. 11, 1998 (JP) ................................ 10-258204
Sep. 11, 1998 (JP) ................................ 10-258205
Jul. 6, 1999 (JP) ................................ 11-191855

(51) Int. Cl.[7] ................................ G02B 27/10
(52) U.S. Cl. .................. 359/618; 359/622; 396/121; 396/104; 396/90
(58) Field of Search ................... 359/618, 622; 396/93, 104, 121, 90, 91, 92

(56) References Cited

U.S. PATENT DOCUMENTS

| 4,857,718 | 8/1989 | Karasaki et al. ............ 250/201 |
| 4,949,116 | 8/1990 | Karasaki et al. ............ 354/408 |
| 4,954,701 | 9/1990 | Suzuki et al. ............ 250/201.8 |
| 5,005,041 | 4/1991 | Suda et al. ............ 354/407 |
| 5,109,154 | 4/1992 | Higashihara et al. ............ 250/201.8 |
| 5,822,627 | * 10/1998 | Moriyama ............ 396/121 |
| 6,097,897 | * 8/2000 | Ide ............ 396/93 |

FOREIGN PATENT DOCUMENTS

| 63-284514 | 11/1988 | (JP) . |
| 63-289513 | 11/1988 | (JP) . |
| 2663657 | 6/1997 | (JP) . |

* cited by examiner

Primary Examiner—Georgia Epps
Assistant Examiner—Timothy Thompson

(57) ABSTRACT

A focal point detection apparatus having a plurality of detection areas comprises a view field mask disposed in the vicinity of a prearranged imaging plane of a photographing lens and provided with a plurality of view field apertures, a condenser lens provided with a plurality of lens units for respectively condensing light fluxes transmitting the plurality of view field apertures, and a re-imaging optical system provided with a plurality of re-imaging lens units for dividing a light flux transmitting each view field aperture into a pair of light fluxes transmitting different areas of the exit pupil of the photographing lens and for forming images of the respective view field apertures on light receiving means.

7 Claims, 13 Drawing Sheets

FOCAL POINT DETECTION APPARATUS

This application claims the benefits of Japanese Application Nos. 10-258204, 10-258205 and 11-191855 which are hereby incorporated by reference.

BACKGROUND OF THE INVENTION

1. Field of the Invention

The present invention relates to a focal point detection apparatus to be used in a single lens reflex camera or the like.

2. Related Background Art

As a focal point detection apparatus provided with a plurality of focal point detection areas, there is generally known an apparatus of a phase shift detection system as shown in FIGS. 11 and 12. FIG. 11 is a perspective view for showing a schematic configuration of a conventional focal point detection apparatus, and FIG. 12 is a view for schematically shown optical paths of the focal point detection apparatus 49 shown in FIG. 11, seen along the axis y in FIG. 11. Light flux from an object comes into the vicinity of a view field mask 12 through an unrepresented photographing lens to form an image there. Lens units 43b, 43c of a condenser lens 43 are arranged such that the optical axes of the respective lens units are eccentric with respect to the view field apertures 12Ya, 12Yb, and the optical axes L4a, L4b of the lens units 43b, 43c are parallel with the optical axis L of the entire optical system of the photographing lens. Out of light fluxes from the object field, a light flux passing the view field aperture 12X which takes a rectangular form elongated along the axis y is divided through the lens unit 43a, like chief rays r4a, r4b shown in FIG. 12, and through stop apertures 44a, 44b of an aperture mask 44 disposed at a position substantially conjugate with an exit pupil of the photographing lens and re-imaging lens units 45a, 45b of a re-imaging optical system 45, thereby forming images respectively on light receiving element arrays 46a, 46b of a CCD chip 46.

It is possible to detect a focal point control condition of the photographing lens by photo-electrically converting a pair of object images formed on the light receiving element arrays 46a, 46b. Specifically, when the focal point control condition of the photographing lens is in a so-called in-focus state in which a clear image is formed on a plane equivalent to a film, the paired object images on the light receiving element arrays 46a, 46b are imaged at positions with a predetermined distance between a front focus state and a rear focus state. Also, when the focal point control condition of the photographing lens is in the so-called front focus state in which the image is clearly formed in front of the plane equivalent to a film, the paired object images on the light receiving element arrays 46a, 46b are formed at positions having a first distance therebetween which is shorter than the predetermined distance. On the other hand, when the focal point control condition of the photographing lens is in the so-called rear focus state in which the clear image is formed in the rear of the plane equivalent to a film, the paired object images on the light receiving element arrays 46a, 46b are formed at positions having a second distance which is longer than the predetermined distance. Accordingly, these paired object images are photo-electrically converted into electric signals by the light receiving element arrays 46a, 46b, and a correlative arithmetic operation or the like is performed based on these electric signals, like in a shift amount detection apparatus disclosed in Japanese Patent application Laid-Open No. 60-37513, to obtain an amount of relative positional shift between the paired object images, whereby the focal point control condition of the photographing lens in a focal point detection area corresponding to the view field aperture 12X is detected.

Also, out of light fluxes from the object field, a light flux passing the view field aperture 12Ya which takes a rectangular form elongated along the axis y of the view field mask 12 is divided through the lens unit 43b, like chief rays r4c, r4d shown in FIG. 12, and through stop apertures 44c, 44d of the aperture mask 44 and re-imaging lens units 45c, 45d of the re-imaging optical system 45, thereby forming images respectively on light receiving element arrays 46c, 46d of the CCD chip 46. In the same manner, a light flux passing the view field aperture 12Yb is divided through the lens unit 43c, like chief rays r4e, r4f shown in FIG. 12, and through stop apertures 44e, 44f of the aperture mask 44 and re-imaging lens units 45e, 45f of the re-imaging optical system 45, thereby forming images respectively on light receiving element arrays 46e, 46f of the CCD chip 46. Then, the focal point conditions of the photographing lens are detected in the focal point detection areas out of the optical axis corresponding to the view field aperture 12Ya by use of the paired object images on the light receiving element arrays 46c, 46d and corresponding to the view field aperture 12Yb by use of the paired object images on the light receiving element arrays 46e, 46f.

In this manner, it is rendered possible to detect the focal point in a plurality of focal point detection areas.

Generally, for the focal point detection in a plurality of focal point detection areas, on a light receiving element array consisting of a CCD chip corresponding to a certain focal point detection area, a light (a so-called stray light) from another focal point detection area is incident, to give a great influence on the accuracy in the focal point detection. For this reason, the art of shielding this stray light by use of a light shielding member is disclosed in the Japanese Patent Application Laid-Open No. 63-289513.

FIG. 13 is a view for schematically showing the optical paths of the focal point detection apparatus 49 shown in FIG. 11 seen along the axis y in this drawing, plus a light shielding member. Note that the identical members to those in FIGS. 11 and 12 are given the same numerals and description thereof will be omitted. A light flux R41 passing through the view field aperture 12X is a focal point detection light flux for entering the light receiving element array 46a through the stop aperture 44a, while a light flux R42 passing through the view field aperture 12Yb is a focal point detection light flux for entering the light receiving element arrays 46e, 46f through the stop apertures 44e, 44f. In this case, a light flux R43 which passes through the stop aperture 44a also transmits through the view field aperture 12Yb. This light flux R43, however, enters the light receiving element array 46a which is an undesired light receiving element array. In other words, the light flux R43 becomes a stray light. Therefore, in order to prevent such stray light, a light shielding member m41 is provided. However, out of the light fluxes transmitting the field view aperture 12Yb, a stray light such as the light flux R44 which passes through the stop aperture 44b can not be completely shielded by the light shielding member m41. Also, the light shielding member m41 is formed to have holes at positions for passing the focal point detection light fluxes, like the view field mask 12, so that, in order to completely shield the light flux R44, a light shielding member having a more complicated form is required.

In addition, when a plurality of focal point detection areas are provided in a photographing frame, a pair of stop apertures and a pair of re-imaging lens units for forming images of a pair of objects on light receiving element arrays are required for each of the focal point detection areas. Then, there is disclosed in the Japanese Patent No. 2663657 a focal point detection apparatus having a focal point detection area at the center of the photographing frame, an aperture mask for using in common stop apertures for focal point detection areas on the both sides of the above-mentioned focal point detection area around the photographing frame, and a re-imaging optical system for using re-imaging lens units in common. FIG. 15 is a perspective view for showing a schematic configuration of the focal point detection apparatus disclosed in the Japanese Patent No. 2663657. In this focal point detection apparatus 39, a light flux which passes through a view field aperture 32X$a$ corresponding to a focal point detection area at the center of a photographing frame forms an image on a CCD chip 36 through stop apertures 34$c$, 34$d$ of an aperture stop 34 and a re-imaging optical system 35. In the same manner, a light flux which passes through a view field aperture 32X$b$ corresponding to the focal point detection area at the center of the photographing frame forms an image on the CCD chip 36 through stop apertures 34$a$, 34$b$ of the aperture mask 34 and the re-imaging optical system 35. A light flux which passes through a view field aperture 32Y$a$ corresponding to a focal point detection area on the periphery of the photographing frame forms an image on the CCD chip 36 through the stop apertures 34$a$, 34$b$ of the aperture mask 34 and the re-imaging optical system 35. In the same manner, a light flux which passes through a view field aperture 32Y$b$ corresponding to a focal point detection area on the periphery of the photographing frame forms an image on the CCD chip 36 through the stop apertures 34$a$, 34$b$ of the aperture mask 34 and the re-imaging optical system 35. That is, the respective light fluxes passing through the view field apertures 32X$b$, 32Y$a$, 32Y$b$ use the stop apertures 34$a$, 34$b$ of the aperture mask 34 in common.

In general, when a distance between a pair of stop apertures of an aperture mask for one focal point detection area is widened, the accuracy in the focal point detection is enhanced. However, a focal point detection area positioned farther from the center of the photographing frame has a larger vignetting phenomenon of the photographing lens. This vignetting phenomenon is described below with reference to FIGS. 14A and 14B. FIG. 14A is a view of a photographing lens when the optical axis of the photographing lens and the visual line of the observer coincide with each other, seen from the exit side of light flux. In this case, the exit pupil P looks like a circle. FIG. 14B is a view of the photographing lens when the observer takes a look in a slanting direction with respect to the optical axis of the photographing lens, seen from the exit side of the light flux. In this case, the exit pupil P' is formed to be a partly cut-away circle, which is called vignetting. When this vignetting becomes further larger, an area Q for indicating a pair of stop apertures is vignetted. That is, when a focal point detection area is located farther from the center of the photographing frame, the focal point detection is affected more easily by the vignetting caused by the light flux from the object field, unless the distance m3 between the paired stop apertures is reduced, which may impede the focal point detection.

For this reason, a focal point control condition detection apparatus is disclosed in the Japanese Patent Application Laid-Open No.1-288810, in which a focal point detection area located farther from the center of the photographing frame has a smaller stop aperture of the aperture mask, or a pair of stop apertures with a narrower gap therebetween. That is, such focal point control condition detection apparatus has a higher accuracy in the focal position detection in the vicinity of the center of the photographing frame which is used most frequently, and, at the same time, can perform focal point detection at a plurality of positions in the photographing frame. However, in the focal point control condition detection apparatus disclosed in the Japanese Patent Application Laid-Open No. 1-288810, a pair of stop apertures and a re-imaging lens unit are required for each of the plurality of focal point detection areas, which results in an increased size of the focal point detection apparatus.

In the focal point detection apparatus disclosed in the Japanese Patent No. 2663657, since the light fluxes passing through the view field apertures 32X$b$, 32Y$a$ and 32Y$b$ corresponding to the focal point detection areas located at the center of the photographing frame and on the periphery thereof use the stop apertures 34$a$, 34$b$ in common, as shown in FIG. 15, increase in size of the focal point detection apparatus can be avoided. However, in the focal point detection area at the center of the photographing frame, though there is a room for enhancing the accuracy in focal point detection by expanding the distance between the corresponding paired stop apertures 34$a$, 34$b$, since the stop apertures 34$a$, 34$b$ are used in common with the focal point detection areas on the periphery of the photographing frame, the distance between the paired stop apertures is determined taking into consideration that there is no influence of the vignetting of the photographing lens in the focal point detection areas on the periphery of the photographing frame. That is, the distance between the paired stop apertures in the focal point detection area at the center of photographing frame is the same as that distance of a paired stop apertures in a focal point detection area on the periphery of the photographing frame. Accordingly, there arises a problem that the proper accuracy in the focal point detection can not be fully displayed.

Further, in the Japanese Patent Application Laid-Open No. 2-50115, there is disclosed a focal point detection apparatus in which focal point detection areas are arranged on the diagonal lines of the photographing frame.

As described above, if a plurality of focal point detection areas are provided in a photographing frame, a pair of stop apertures and a pair of re-imaging lens units for forming a pair of object images on light receiving element arrays are required for each of the focal point detection areas. Also, in a focal point detection area by a view field aperture having a rectangular form elongated along the axis y, the focal point detection can not be performed for an object with a brightness fluctuation along the axis x.

In the Japanese Patent Application Laid-Open No. 2-50115, focal point detection areas are disposed also on the diagonal lines of the photographing frame for allowing the focal point detection at a larger number of positions by increasing the number of the focal point detection areas. In this arrangement, however, a pair of stop apertures and a pair of re-imaging lens units are required for each of the additional focal point detection areas. Also, in a focal point detection area corresponding to a cross-shaped view field aperture, two pairs of aperture masks and two pairs of re-imaging lens units are required, which results in the increased size of the focal point detection apparatus and a more complicated structure of the focal point detection optical system itself.

SUMMARY OF THE INVENTION

A first object of the present invention is to provide a focal point detection apparatus which is capable of executing focal point detection in a plurality of focal point detection areas and of shielding a stray light in a simple structure.

A second object of the present invention is to provide a focal point detection apparatus in which stop apertures and re-imaging lens units for at least two of a plurality of focal point detection areas can be used in common and the precision in focal point detection can be enhanced in the focal point detection areas in the vicinity of the center of the photographing frame.

A third object of the present invention is to provide a focal point detection apparatus which is capable of simplifying the configuration of a focal point detection optical system in spite of a large number of focal point detection areas therein and widely reducing an unfitted part of the object in all of the focal point detection areas.

In order to achieve the first object, according to the present invention, there is provided a focal point detection apparatus comprising: a view field mask disposed in the vicinity of a prearranged imaging plane of a photographing lens and provided with a plurality of view field apertures corresponding to a plurality of focal point detection areas; a condenser lens provided with a plurality of lens units for respectively condensing light fluxes transmitting the plurality of view field apertures of the view field mask; and a re-imaging optical system provided with a plurality of re-imaging lens units for dividing the light fluxes respectively transmitting the plurality of view field apertures into light fluxes transmitting different areas of the exit pupil of the photographing lens and for forming the images of the plurality of view field apertures on light receiving means, being characterized in that the plurality of lens units are arranged such that the light fluxes transmitting the plurality of view field apertures cross each other between the condenser lens and the re-imaging optical system.

Further, in order to achieve the first object, according to the present Invention, there is provided a focal point detection apparatus comprising: a view field mask disposed in the vicinity of a prearranged imaging plane of the photographing lens and provided with a plurality of view field apertures corresponding to a plurality of focal point detection areas; a condenser lens provided with a plurality of lens units for respectively condensing light fluxes transmitting the plurality of view field apertures of the view field mask; and a re-imaging optical system provided with a plurality of re-imaging lens units for dividing the light fluxes respectively transmitting the plurality of view field apertures into a pair of light fluxes transmitting different areas of the exit pupil of the photographing lens and for forming the images of the plurality of view field apertures on light receiving means, being characterized in that there is further provided deflection means for deflecting a travelling direction of light flux and the deflection means is disposed such that that the light fluxes transmitting the plurality of view field apertures cross each other between the condenser lens and the re-imaging optical system.

According to this arrangement, the deflection means is disposed such that that the respective light fluxes transmitting the plurality of view field apertures corresponding to the plurality of focal point detection areas cross each other between the condenser lens and the re-imaging optical system. As a result, it is possible to simplify the configuration of a light shielding member for preventing a so-called stray light which is a light flux coming from a certain focal point detection area and entering an undesired light receiving element array, thereby enhancing the precision in focal point detection. Also, with provision of the deflection means, the lens unit of the condenser lens is not required to be made eccentric, so that the radius of curvature of the condenser lens is not required to be reduced. In addition, it is possible to avoid an insufficient thickness of the border of the condenser lens.

In order to achieve the second object of the present invention, according to the present invention, there is provided a focal point detection apparatus comprising: a view field mask provided with a plurality of view field apertures corresponding a plurality of focal point detection areas; a condenser lens provided with a plurality of lens units for respectively condensing light fluxes transmitting the plurality of view field apertures of the view field mask; an aperture mask provided with plural pairs of stop apertures for dividing each of the light fluxes respectively transmitting the plurality of view field apertures into a pair of light fluxes transmitting different areas of the exit pupil of the photographing lens; and a re-imaging optical system provided with a plurality of re-imaging lens units for forming the images of the plurality of view field apertures on light receiving means, being characterized in that the paired stop apertures respectively corresponding to at least two focal point detection areas out of the plurality of focal point detection areas use each other partly in common, at least two focal point detection areas consist of at least first and second focal point detection areas having different distances from the optical axis of the photographing lens, and, when the second focal point detection area is farther separated from the optical axis of the photographing lens than the first focal point detection area, the gap between the paired stop apertures corresponding to the first focal point detection area is wider than the gap between the paired stop apertures corresponding to the second focal point detection area.

In order to achieve the third object of the present invention, according to the present invention, there is provided a focal point detection apparatus comprising: a view field mask disposed in the vicinity of a prearranged imaging plane of the photographing lens and provided with a plurality of view field apertures corresponding to a plurality of focal point detection areas; a condenser lens provided with a plurality of lens units for respectively condensing light fluxes transmitting the plurality of view field apertures of the view field mask; an aperture mask provided with plural pairs of stop apertures for dividing each of the light fluxes respectively transmitting the plurality of view field apertures into a pair of light fluxes transmitting different areas of the exit pupil of the photographing lens; and a re-imaging optical system provided with a plurality of re-imaging lens units for forming the images of the plurality of view field apertures on light receiving means, wherein there is further provided another focal point detection area having a cross-shaped view field aperture at a position out of a line for connecting the centers of the first and second focal point detection areas to each other, and an image transmitting one of the rectangular view field apertures out of the cross-shaped view field aperture uses the stop aperture and the re-imaging lens unit corresponding to the first focal point detection area, while an image transmitting the other rectangular view field aperture uses the stop aperture and the re-imaging lens unit corresponding to the second focal point detection area.

DETAILED DESCRIPTION OF THE PREFERRED EMBODIMENTS

Preferred embodiments of the present invention will be described below with reference with drawings.

Figure 1:
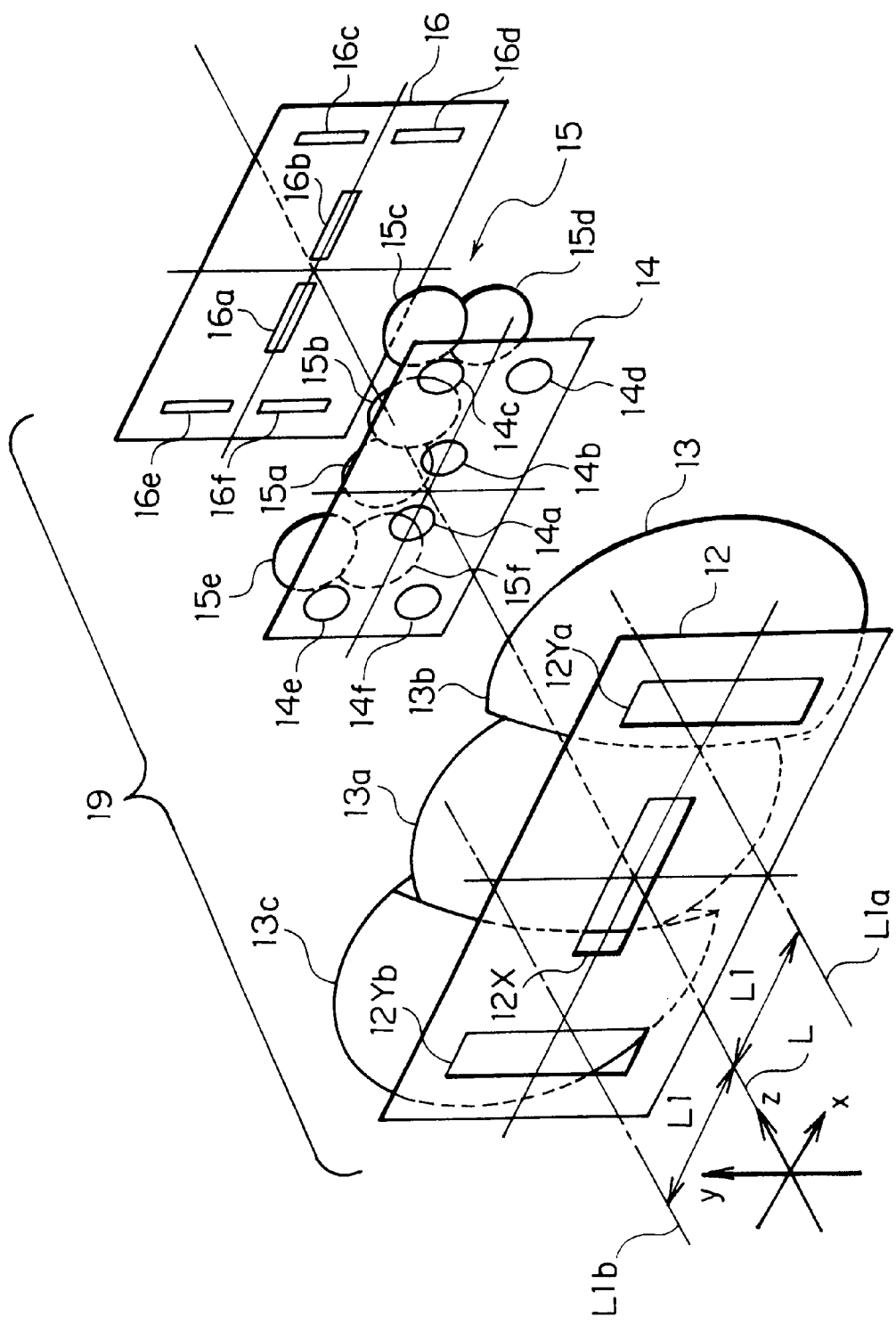
FIG. 1 is a perspective view for showing a schematic configuration of a focal point detection apparatus according to a first embodiment of the present invention.
Figure 2:
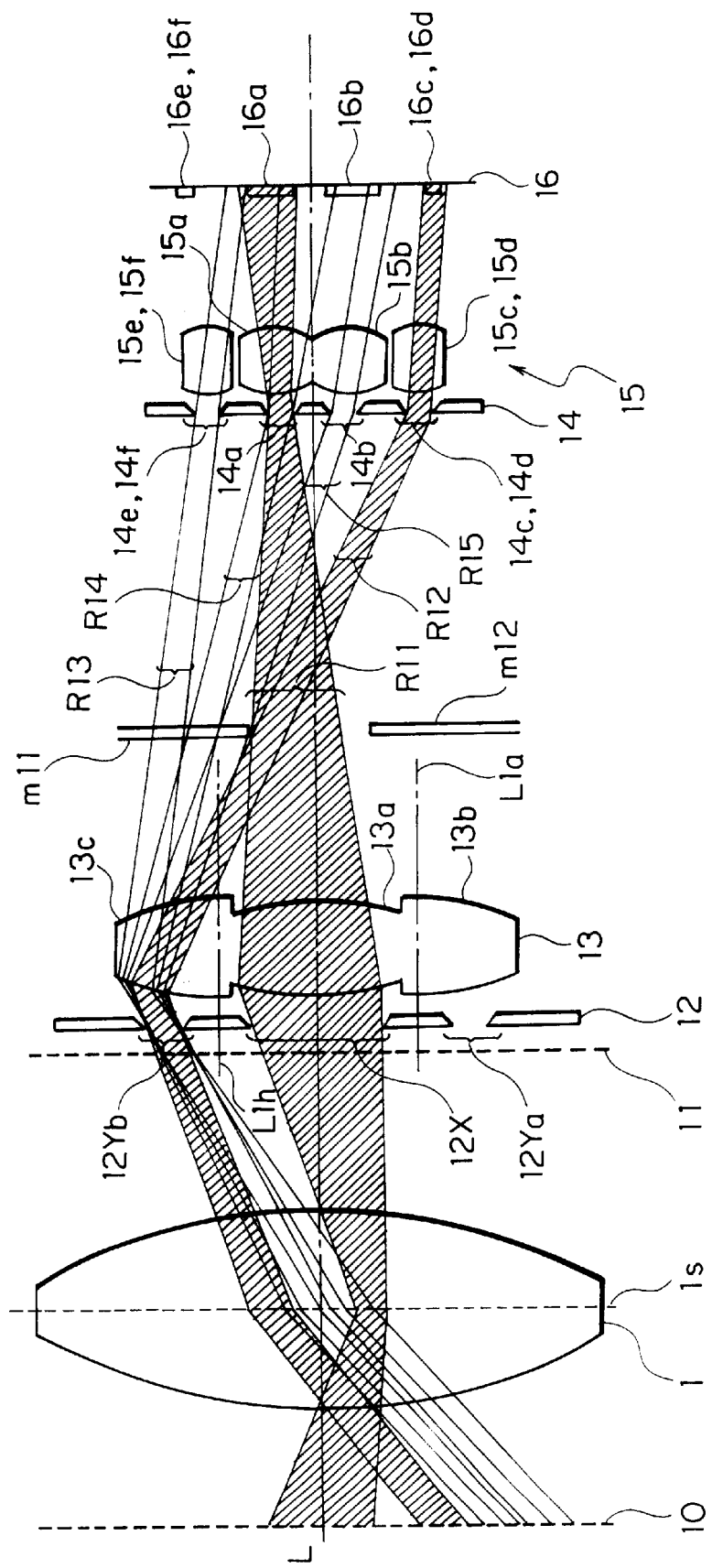
FIG. 2 is a schematic diagram of optical paths in the focal point detection apparatus shown in FIG. 1 and in the vicinity thereof.

FIG. 1 is a perspective view for showing a schematic configuration of a focal point detection apparatus according to the first embodiment of the present invention. FIG. 2 is a schematic diagram for showing optical paths in the focal point detection apparatus 19 shown in FIG. 1 and in the vicinity thereof, seen along the axis y, for clearly illustrating a state of stray light.

A light flux from an object field 10 is imaged on a prearranged imaging plane 11 in the vicinity of a view field mask 12 which is provided with three view field apertures 12X, 12Ya and 12Yb, through an exit pupil plane 1s of a photographing lens 1. The view field aperture 12X has a rectangular shape elongated along the axis x with the center thereof on the optical axis L of a focal point detection optical system. The view field apertures 12Ya and 12Yb, each having a rectangular shape elongated in the direction of the axis y, are equidistant from the optical axis L with the centers thereof on the axis x.

At the back of the view field mask 12, there is provided a condenser lens 13. The condenser lens 13 integrally comprises three lens units 13a, 13b and 13c. Out of these lens units, the central lens unit 13a is corresponding to the view field aperture 12X, having its optical axis aligned with the optical axis L of the focal point detection optical system.

The remaining two lens units 13b and 13c are respectively corresponding to the view field apertures 12Ya and 12Yb, and are disposed at the back of these view field apertures 12Ya, 12Yb symmetrical with respect to the optical axis L. Accordingly, the optical axis L1a of the lens unit 13b and the optical axis L1b of the lens unit 13c are disposed to be separated from the optical axis L by the distance L1, to be respectively in parallel to the optical axis L, and moreover, to be passed respectively through the centers of the corresponding view field apertures 12Ya, 12Yb.

At the back of the condenser lens, an aperture mask 14 is disposed at a position conjugate with the exit pupil plane 1s of the photographing lens 1. The aperture mask 14 is formed with two stop apertures 14a, 14b which are formed on the axis x to be equidistant from the optical axis L correspondingly to the view field aperture 12x and the lens 13a, two stop apertures 14e, 14f which are formed equidistant from the optical axis L and the axis y correspondingly to the view field aperture 12Ya and the lens unit 13b, and two stop apertures 14c, 14d which are formed, in the same manner, equidistant from the optical axis L and the axis y correspondingly to the view field aperture 12Yb and the lens unit 13c. Thus, the stop apertures 14a, 14e and 14f and the stop apertures 14b, 14c and 14d are symmetrically disposed with respect to the optical axis L.

A re-imaging optical system 15 which is provided with six re-imaging lens units 15a, 15b, 15c, 15d, 15e and 15f respectively corresponding to the six stop apertures 14a, 14b, 14c, 14d, 14e and 14f is arranged at the back of the aperture mask 14. A light flux passing through the re-imaging lens units 15a, 15b, 15c, 15d, 15e and 15f is re-imaged on a CCD chip 16 which is provided with six light receiving element arrays 16a, 16b, 16c, 16e and 16f.

Figure 11:
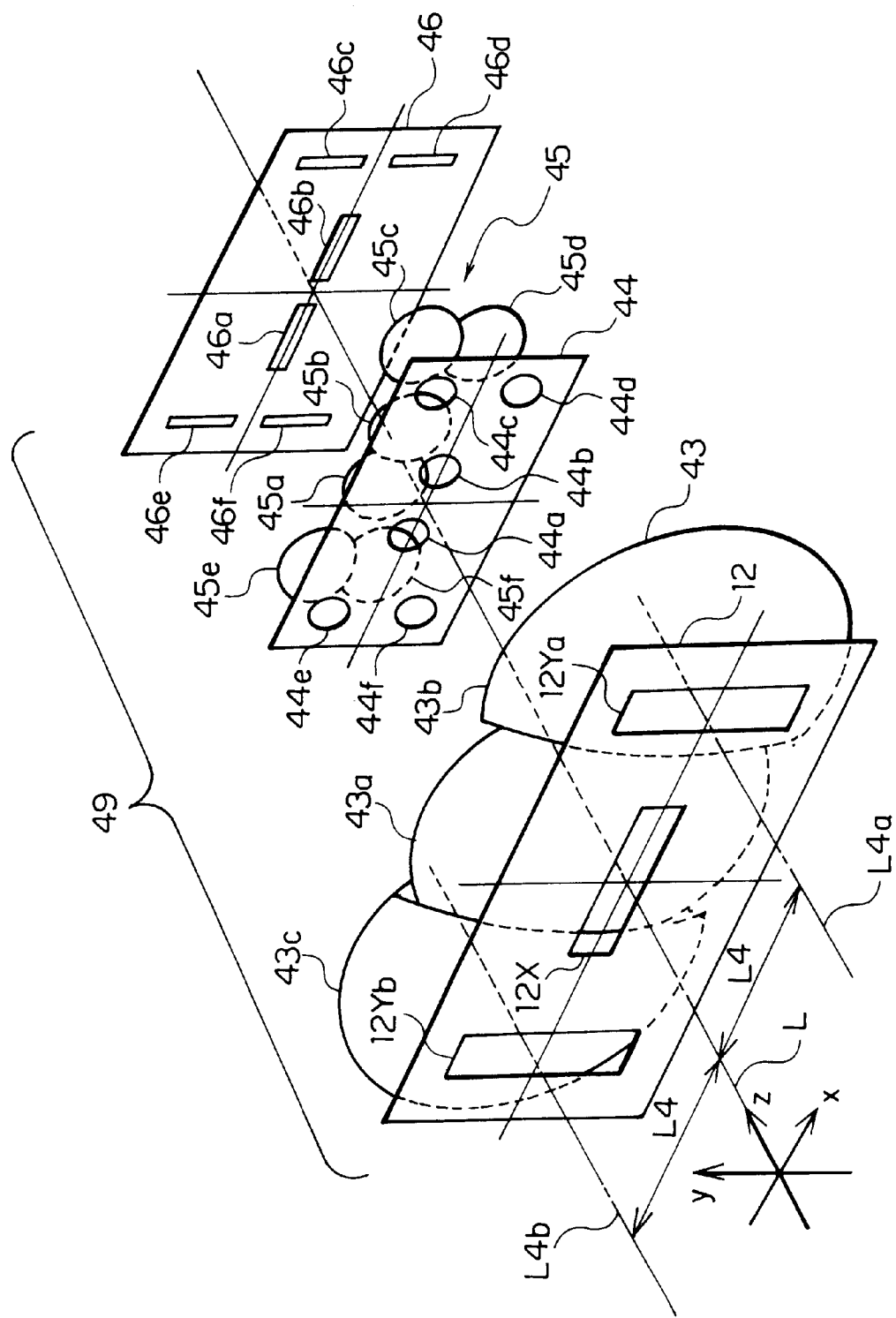
FIG. 11 is a perspective view for showing a schematic configuration of a conventional focal point detection apparatus.
Figure 12:
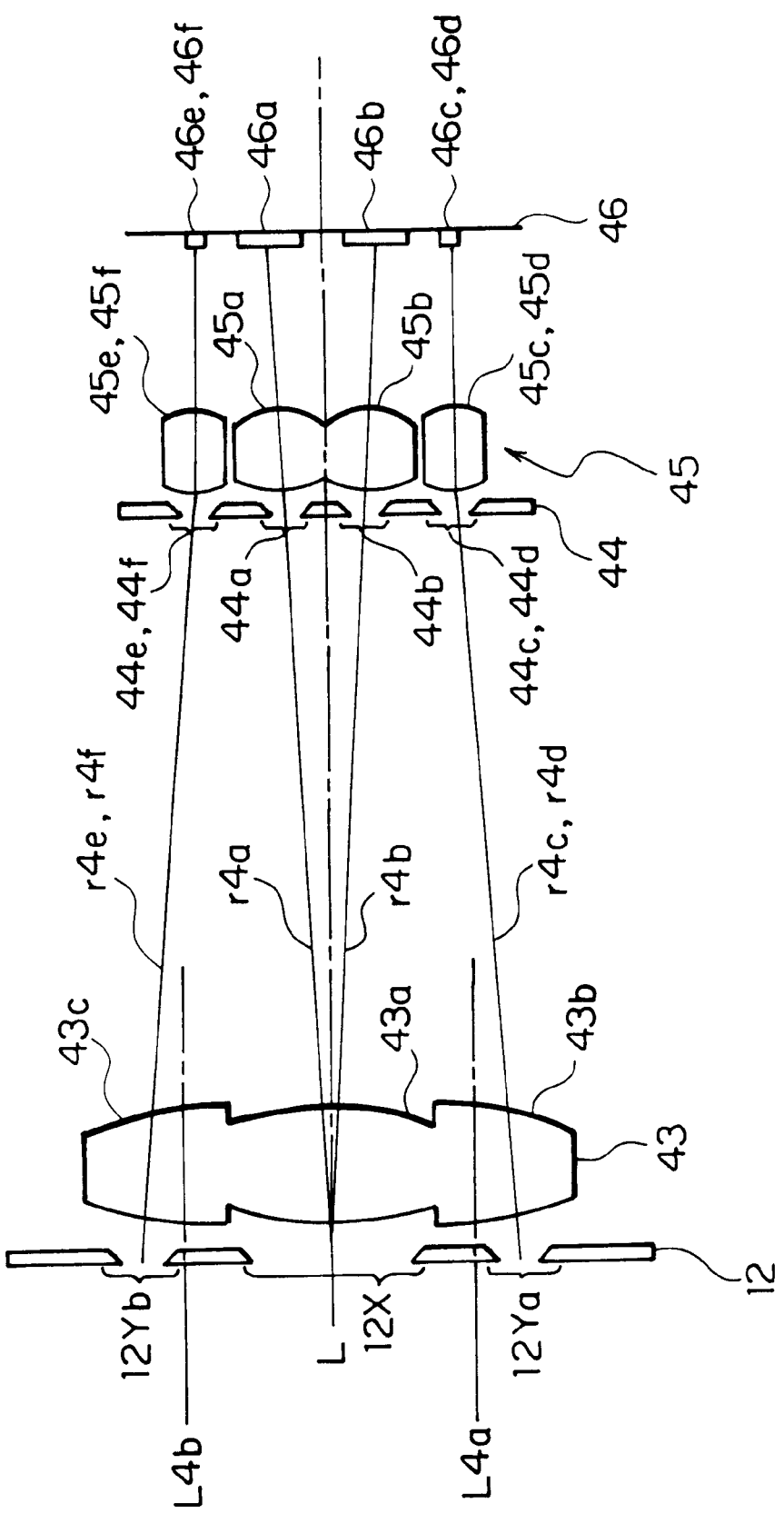
FIG. 12 is a schematic diagram of optical paths in the focal point detection apparatus shown in FIG. 11.
Figure 13:
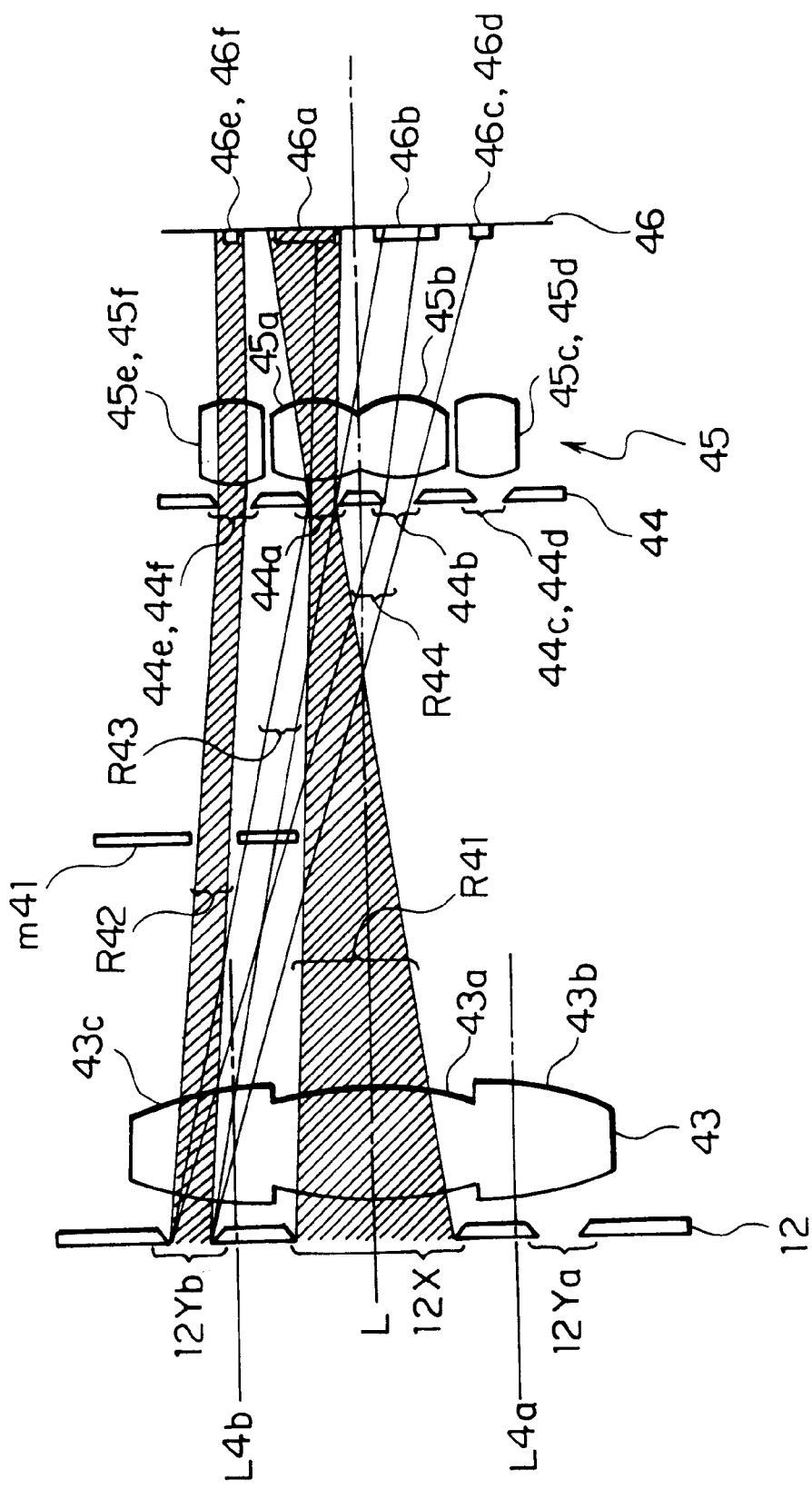
FIG. 13 is a schematic diagram of optical paths in the focal point detection apparatus shown in FIG. 11.
Figure 14A:
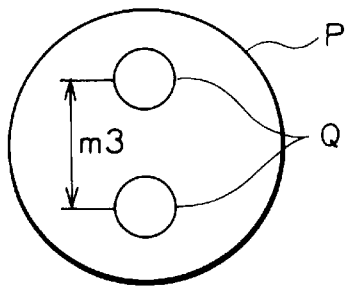
FIGS. 14A and 14B are views for illustrating vignetting.
Figure 14B:
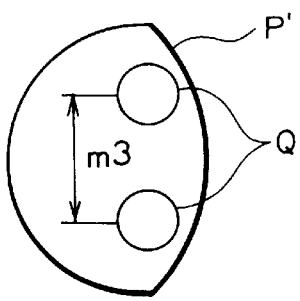
Figure 15:
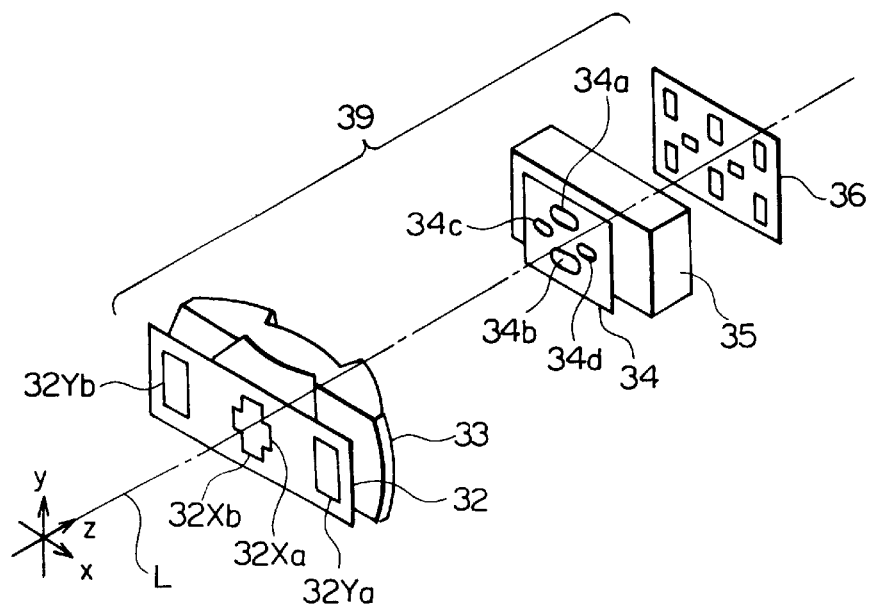
FIG. 15 is a perspective view for showing a schematic configuration of a conventional focal point detection apparatus.

In the present embodiment, the degree of eccentricity of the lens units 13b and 13c of the condenser lens 13 is different from that of the conventional focal point detection apparatus shown in FIGS. 11 to 13. More specifically, when the radiuses of curvature and inclinations with respect to the optical axis L of the lens units 13a, 13b and 13c of the condenser lens 13 in the focal point detection apparatus according to the first embodiment shown in FIG. 1 and the radiuses of curvature and inclinations with respect to the optical axis L of the lens units 43a, 43b and 43c of the condenser lens 43 in the conventional focal point detection apparatus 49 shown in FIG. 11 are equal to each other, the degree of eccentricity of the lens units 13b, 13c are differentiated by making the distance L1 between the optical axis L and the optical axis L1a of the lens unit 13b or between the optical axis L and the optical axis L1b of the lens unit 13c in the focal point detection apparatus according to the first embodiment to be smaller than a distance L4 between the optical axis L and the optical axis L4a of the lens unit 43b or between the optical axis L and the optical axis L4b of the lens unit 43c in the conventional focal point detection apparatus.

As stated above, as shown in FIG. 2, a light flux R12 which is used In focal point detection, out of light fluxes from the object field 10, enters the light receiving element array 16c or 16d through the view field aperture 12Yb, and the stop aperture 14c or 14d. In the same manner, a light flux R11 enters the light receiving element array 16a through the view field aperture 12X and the stop aperture 14a. In this case, among light fluxes from the object field 10, there exists a light flux R13 which enters the light receiving element array 16a through the view field aperture 12Yb and the stop aperture 14e or 14f. However, the light flux R13 is a stray light which is unnecessary for the light receiving element array 16a. In the same manner, light fluxes R14 and R15 are also undesired stray lights which enter the light receiving element arrays 16a and 16b. A light shielding member m11 is provided to shield all of these stray lights. More specifically, any light flux, out of light fluxes passing through the view field aperture 12Yb, which may stray is interceptted by the light shielding member m11.

A light shielding member m12 is also provided to be symmetrical about the optical axis L with respect to light shielding member m11. It is arranged to intercept any light flux, out of light fluxes passing through the view field aperture 12Ya, which may stray by use of the light shielding member m12.

Also according to the present embodiment, since all the radiuses of the curvature of the lens units 13a, 13b, 13c can be made the same, a condenser lens having a simpler structure may be used.

Since it is arranged such that the light flux R11 and the light flux R12 are crossing each other between the condenser lens 13 and the re-imaging optical system 15 by adjusting the degree of eccentricity of the lens unit 13c, a stray light which is unnecessary for focal point detection can be shielded with a simple structure.

The term "crossing" in this case means that the focal point detection light fluxes passing through the view field apertures 12Ya, 12Yb provided out of the optical axis L do not enter the stop apertures 14c, 14d and the stop apertures 14e, 14f, which pairs are respectively corresponding to the view field apertures 12Ya, 12Yb, but enter the stop apertures 14e, 14f and the stop apertures 14c, 14d which are provided on the opposite sides with respect to the optical axis L. This applies to the following arrangements.

Figure 3:
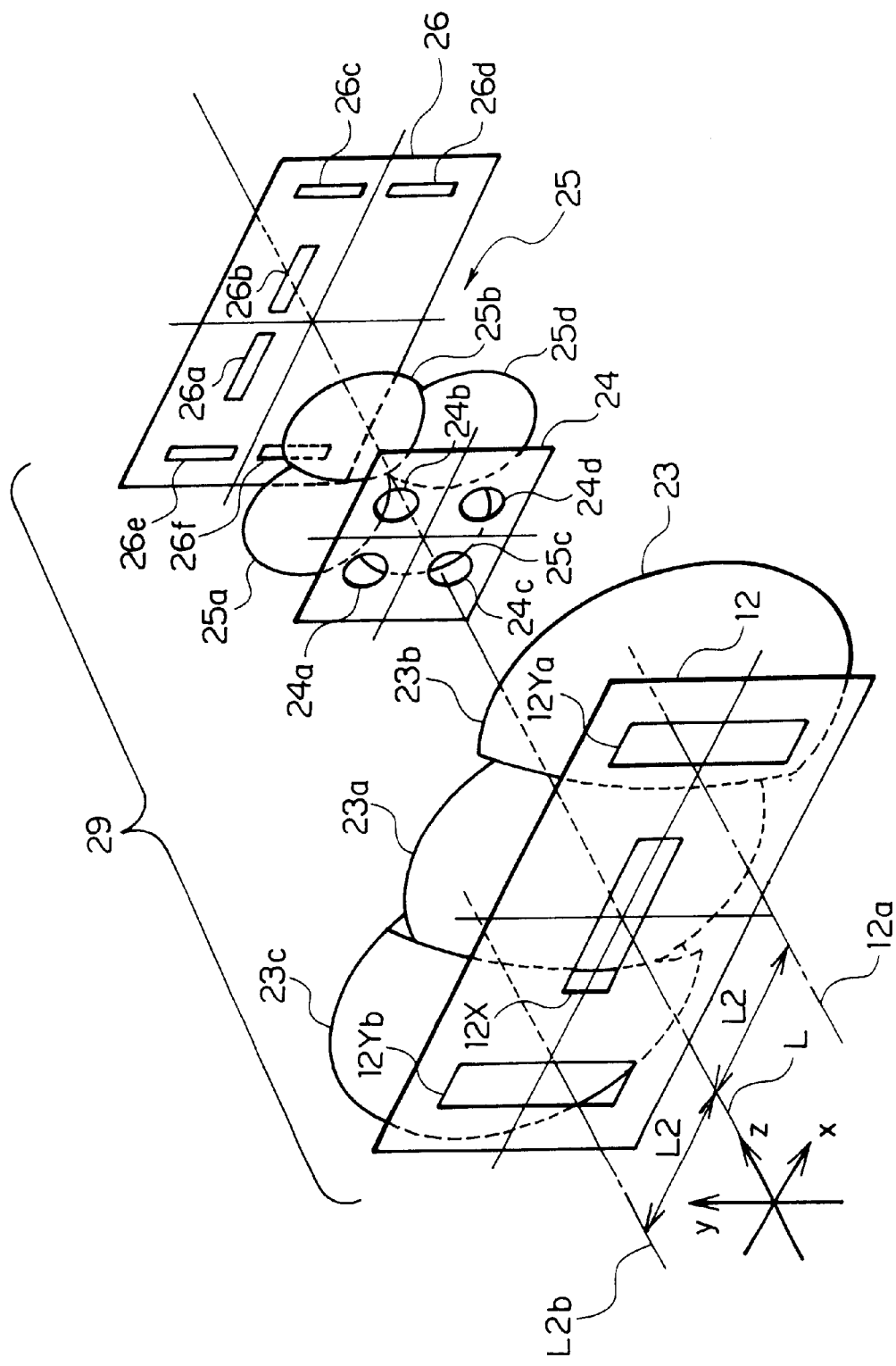
FIG. 3 is a perspective view for showing a schematic configuration of a focal point detection apparatus according to a second embodiment of the present invention.
Figure 4:
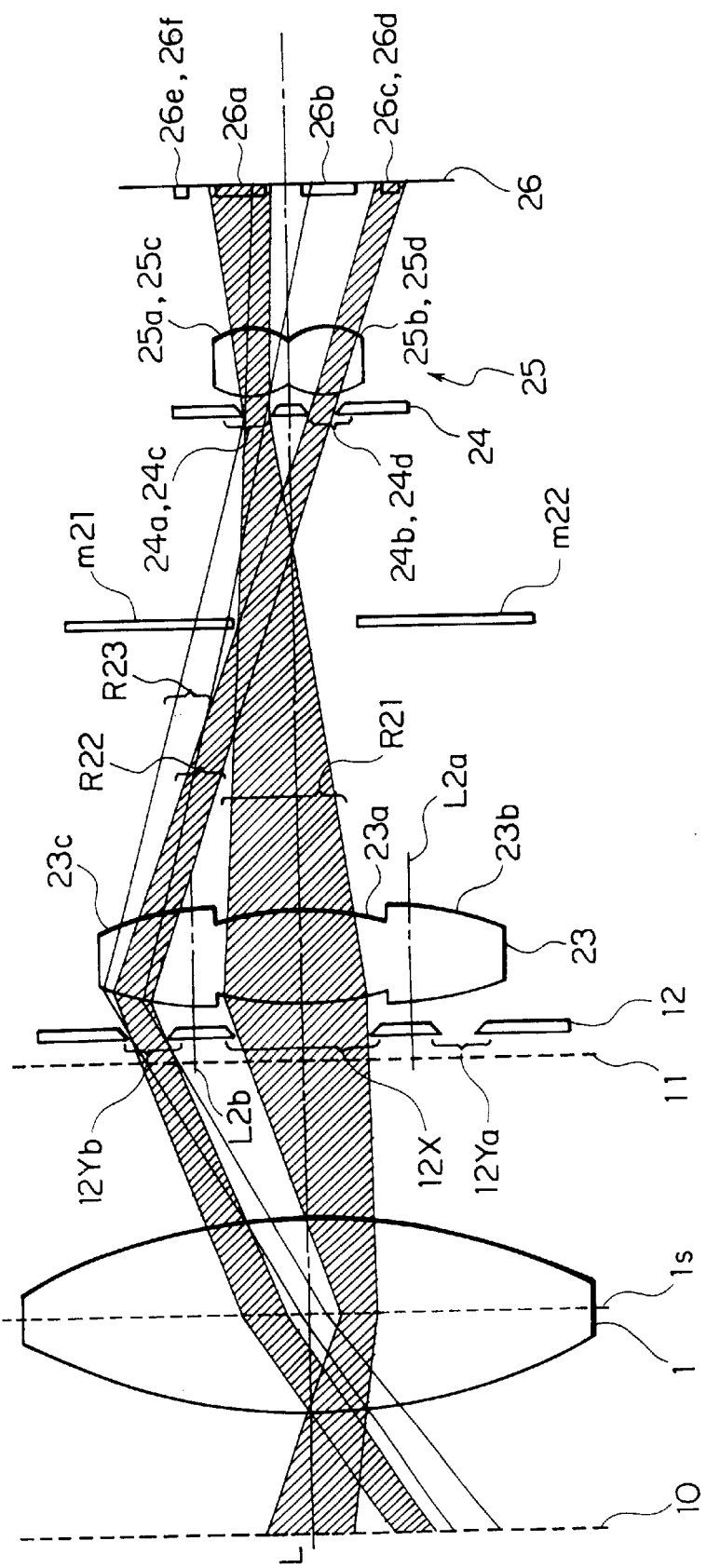
FIG. 4 is a schematic diagram of optical paths in the focal point detection apparatus shown in FIG. 3 and in the vicinity thereof.

FIG. 3 is a perspective view for showing a schematic configuration of a focal point detection apparatus according to the second embodiment of the present invention. FIG. 4 is a diagram for schematically showing optical paths in the focal point detection apparatus 29 shown in FIG. 3 and in the vicinity thereof seen along the axis y in this diagram, for clear understanding of the state of a stray light. Note that the identical portions to those in FIGS. 1 and 2 are given the same referential numerals and description thereof will be omitted.

A light flux from the object field 10 is imaged on the prearranged imaging plane 11 In the vicinity of the view field mask 12 through the exit pupil plane Is of the photographing lens 1. Further, the light flux from the object field 10 is re-imaged on a CCD chip 26 provided with six light receiving element arrays 26a, 26b, 26c, 26d, 26e and 26f through a condenser lens 23 provided with three lens units 23a, 23b, and 23c, an aperture mask 24 provided with four stop apertures 24a, 24b, 24c and 24d, and a re-imaging optical system 25 provided with four re-imaging lens units 25a, 25b, 25c and 25d. Note that the exit pupil plane Is and the aperture mask 24 are conjugate with each other.

In the present embodiment, an inclination of the central lens unit 23a of the condenser lens 23 with respect to the optical axis L and the degrees of eccentricity of the lens units 23b and 23c are different from those of the focal point detection apparatus according to the first embodiment shown in FIGS. 1 and 2. More specifically, when the radiuses of curvature and the inclinations with respect to the optical axis L of the lens units 23a, 23b and 23c of the condenser lens 23 in the focal point detection apparatus 29 according to the second embodiment shown in FIG. 3 and the radiuses of curvature and the inclinations with respect to the optical axis L of the lens units 13a, 13 and 13c of the condenser lens 13 in the focal point detection apparatus 19 according to the first embodiment shown in FIG. 1 are equal to each other, the degrees of eccentricity of the lens units 23b, 23c are differentiated by making a distance L2 between the optical axis L of the entire optical system and the optical axis L2a of the lens unit 23b or between the optical axis L and the optical axis L2b of the lens unit 23c in the focal point detection apparatus according to the second embodiment to be wider than the distance L1 between the optical axis L and the optical axis La or between the optical axis L and the optical axis Lb in the focal point detection apparatus according to the first embodiment.

In the present embodiment, the view field aperture 12X has a rectangular shape elongated along the axis x with the center thereof on the optical axis L of the focal point detection optical system, while the view field apertures 12Ya and 12Yb, each having a rectangular shape elongated in the direction of the axis y, are equidistant by the distance L2 from the optical axis L with the centers thereof on the axis x.

At the back of the view field mask 12, there is provided the condenser lens 23. The condenser lens 23 integrally comprises the three lens units 23a, 23b and 23c. Out of these lens units, the central lens unit 23a is corresponding to the view field aperture 12X, with the optical axis thereof aligned with the optical axis L of the focal point detection optical system. The remaining two lens units 23b and 23c are respectively corresponding to the view field apertures 12Ya and 12Yb, and are disposed at the back of these view field apertures 12Ya and 12Yb to be symmetrical with respect to the optical axis L. Accordingly, the optical axis L2a of the lens unit 23b and the optical axis L2b of the lens unit 23c are disposed to be separated from the optical axis L by the distance L2, to be respectively in parallel to the optical axis L, and moreover, to be passed through the centers of the corresponding view field apertures 12Ya and 12Yb.

At the back of the condenser lens 23, the aperture mask 24 is disposed at a position conjugate with the exit pupil plane is of the photographing lens 1. The aperture mask 24 comprises the four stop apertures 24a, 24b, 24c and 24d which are formed equidistant from the optical axis L at equal intervals with each other. That is, the stop apertures 24a, 24b, 24c and 24e are symmetrically disposed with respect to the optical axis L.

The re-imaging optical system 25 which comprises the four re-imaging lenses 25a, 25b, 25c and 25d respectively corresponding to the four stop apertures 24a, 24b, 24c and 24d is disposed at the back of the aperture mask 24. A light flux passing through the re-imaging lenses 25a, 25b, 25c and 25d is re-imaged on the CCD chip 26 which is provided with the six light receiving element arrays 26a, 26b, 26c, 26d, 26e and 26f.

In the present embodiment, a light flux R21 passing through the view field aperture 12X is imaged on the light receiving element arrays 26a, 26b via the stop apertures 24a, 24b of the aperture mask 24 and the re-imaging lens units 25a, 25b of the re-imaging optical system 25, while a light flux R22 passing through the view field aperture 12Yb is imaged on the light receiving element arrays 26c, 26d via the stop apertures 24b, 24d and the re-imaging lens units 25b, 25d. That is, the light flux R21 passing through the view field aperture 12X and the light flux R22 passing through the view field aperture 12Yb use the stop aperture 24b of the aperture mask 24 and the re-imaging lens unit 25b in common. In the same manner, the light flux R21 passing the view field aperture 12X and a light flux passing through the view field aperture 12Ya (not shown) use the stop aperture 24a and the re-imaging lens unit 25a in common.

As stated above, as shown in FIG. 4, the light flux R21 which is used in focal point detection, out of light fluxes from the object field 10, enters the light receiving element arrays 26a, 26b through the view field aperture 12X and the stop apertures 24a, 24b. In the same manner, the light flux R22 enters the light receiving element array 26c or 26d through the view field aperture 12Yb and the stop aperture 24b or 24d. In this case, among light fluxes from the object field 10, there exists a light flux R23 for entering the light receiving element arrays 26a, 26b through the view field aperture 12Yb and the stop aperture 24a or 24c. However, the light flux R23 is a stray light which is unnecessary for the light receiving element arrays 26a, 26b. The light shielding member m21 is provided to shield such stray light.

More specifically, any light flux, out of the light fluxes passing through the view field aperture 12Yb, which is not used in focal point detection is intercepted by the light shielding member m21.

In the same manner, a light shielding member m22 is provided to be symmetrical about the optical axis L to intercept any light flux, out of the light fluxes passing through the view field aperture 12Ya, which is not used in focal point detection.

According to the present embodiment, only four stop apertures of the aperture mask 24 and four re-imaging lens units of the re-imaging optical system 25 are required, which is the number smaller than that of the lens units in the first embodiment, whereby the focal point detection apparatus can be constituted simply. Further, since all of the radiuses of curvature of the lens units 23a, 23b and 23c can be set to be the same, a condenser lens with a simpler structure may be used.

As described, it is arranged such that the light flux R21 and the light flux R22 are made to cross each other between the condenser lens 23 and the re-imaging optical system 25 by adjusting the degree of eccentricity of the lens unit 23c, so that a stray light unnecessary for focal point detection can be shielded with a simple structure.

Figure 5:
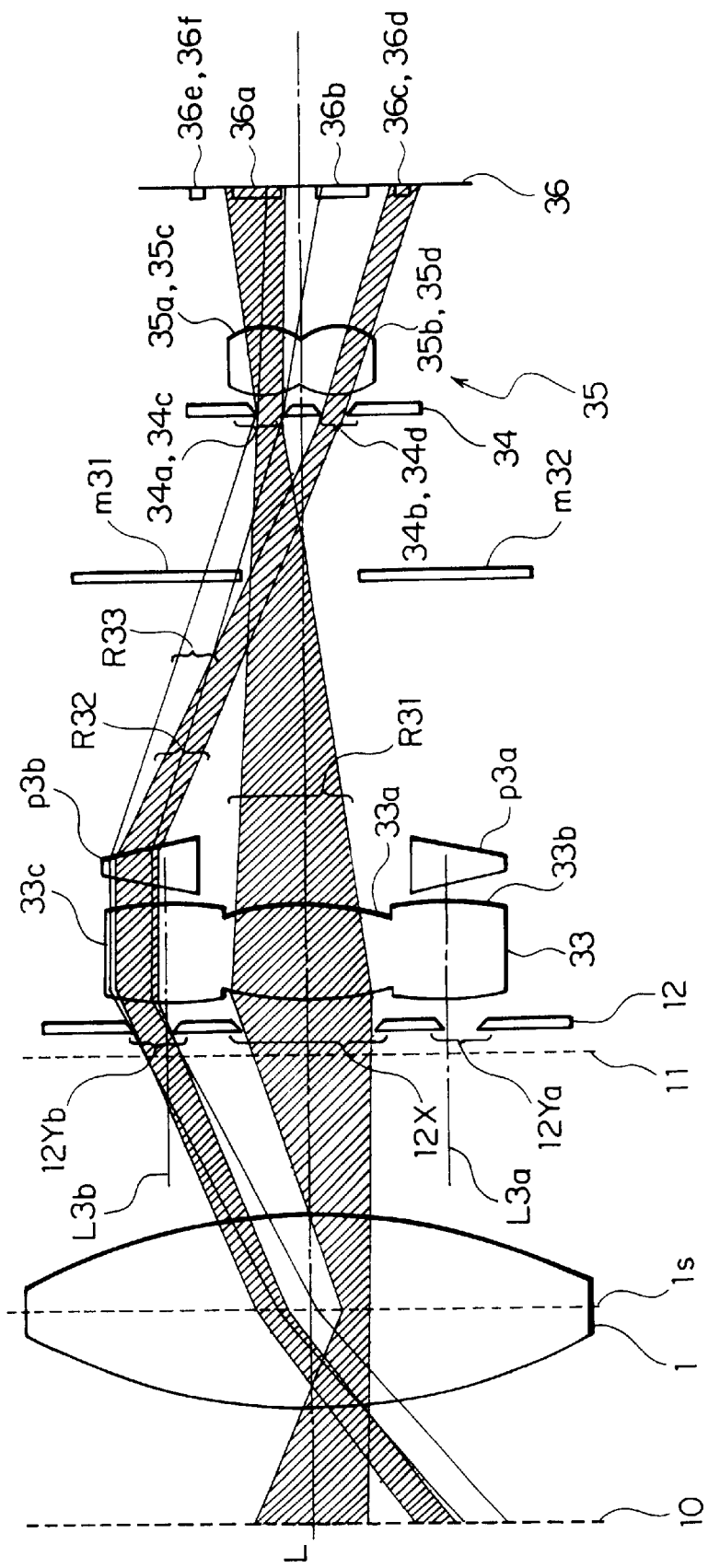
FIG. 5 is a schematic diagram for showing optical paths in a focal point detection apparatus according to a third embodiment of the present invention and in the vicinity thereof.

FIG. 5 is a diagram for schematically showing optical paths in a focal point detection apparatus according to the third embodiment of the present invention, and in the vicinity thereof, seen along the axis y. Note that the identical portions to those shown in FIGS. 1 and 2 are given the same referential numerals and description thereof will be omitted. The arrangement that the aperture mask and the re-imaging optical system are used in common by the light flux passing through the view field aperture 12X and the light flux passing through the view field aperture 12Ya, and in common by the light flux passing through the view field aperture 12X and the light flux passing through the view field aperture 12Yb is the same as that of the focal point detection apparatus according to the second embodiment.

A light flux from the object field 10 is imaged on the prearranged imaging plane 11 in the vicinity of the view field mask 12 through the exit pupil plane Is of the photographing lens 1. Further, the light flux from the object field 10 is re-imaged on a CCD chip 36 which is provided with six light receiving element arrays 36a, 36b, 36c, 36d, 36e and 36f, as that in the foregoing embodiment, through a condenser lens 33 provided with three lens units 33a, 33b and 33c, as that in the foregoing embodiment, an aperture mask 34 provided with four stop apertures 34a, 34b, 34c and 34d, as that in the second embodiment, and a re-imaging optical system 35 provided with four re-imaging lens units 35a, 35b, 35c and 35d, as that in the second embodiment. Note that the exit pupil plane Is and the aperture mask 34 are conjugate with each other.

In the present embodiment, a travelling direction of a light flux is deflected by prisms p3a, p3b, so that the degrees of eccentricity of the lens units 33b, 33c of the condenser lens 33 can be set arbitrarily. That is, the degrees of the lens units 33a, 33b may be the same as those in the conventional apparatus shown in the drawing. Also, the radiuses of curvature of the lens units 33b, 33c may not be smaller than those in the first and second embodiments.

As stated above, as shown in FIG. 5, a light flux R31 which is used in focal point detection, out of light fluxes from the object field 10, enters the light receiving element arrays 36a, 36b through the view field aperture 12X, and the stop aperture 34a or 34b. In the same manner, a light flux R32 enters the light receiving element array 36c or 36d through the view field aperture 12Yb and the stop aperture 34b or 34d. In this case, among light fluxes from the object field 10, there exists a light flux R33 for entering the light receiving element arrays 36a, 36b through the view field aperture 12Yb, the prism p3b, and the stop aperture 34a or 34c. However, the light flux R33 is a stray light which is unnecessary for the light receiving element arrays 36a, 36b. A light shielding member m31 is provided to shield such stray light.

More specifically, any light flux, out of light fluxes passing through the view field aperture 12Yb, which is not used in focal point detection is intercepted by the light shielding member m31.

In the same manner, a light shielding member m32 is provided to be symmetrical about the optical axis L to intercept any light flux, out of the light fluxes passing through the view field aperture 12Ya, which is not used in focal point detection.

As described above, with provision of the prisms p3a and p3b, the light flux R31 and the light flux R32 are arranged to cross each other between the condenser lens 33 and the re-imaging optical system 35, so that a stray light unnecessary for focal point detection can be shielded in a simple structure.

Also, the third embodiment employs the arrangement that the aperture mask 34 and the re-imaging optical system 35 are provided for common use. However, it may be arranged such that a stop aperture and a re-imaging lens unit are independently provided for each focal point detection area, as in the first embodiment.

The foregoing embodiments are described to help clear understanding of the present invention. However, the present invention is not limited to these embodiments. For example, it may be arranged such that the aperture masks 14, 24, 34 are omitted. It may be also arranged to adjust the degree of inclination, instead of adjusting the degrees of eccentricity of the lens units 13b, 13c, 23b, 23c, to change the travelling direction of a light flux.

Figure 6:
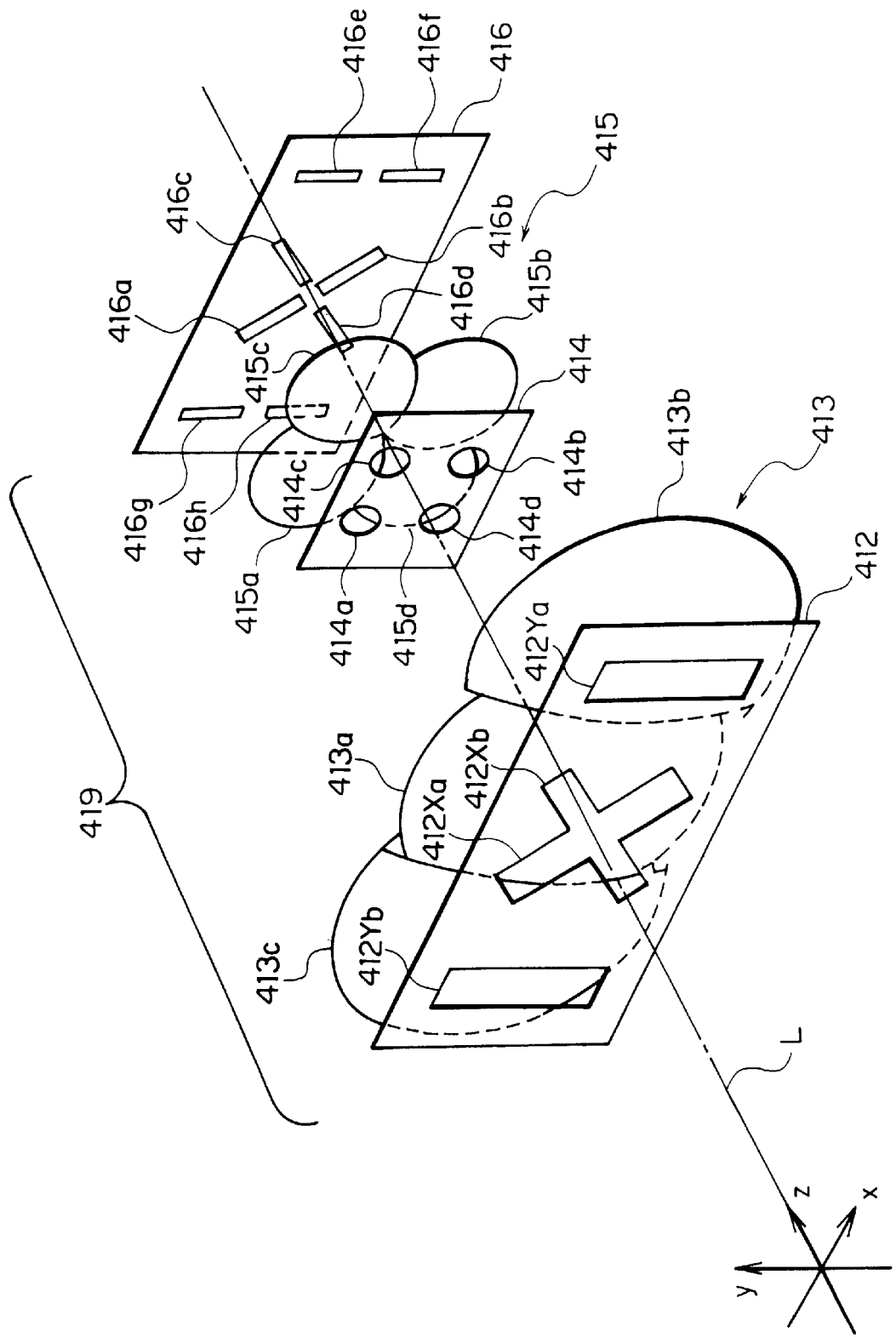
FIG. 6 is a perspective view for showing a schematic configuration of a focal point detection apparatus according to a fourth embodiment of the present invention.
Figure 7:
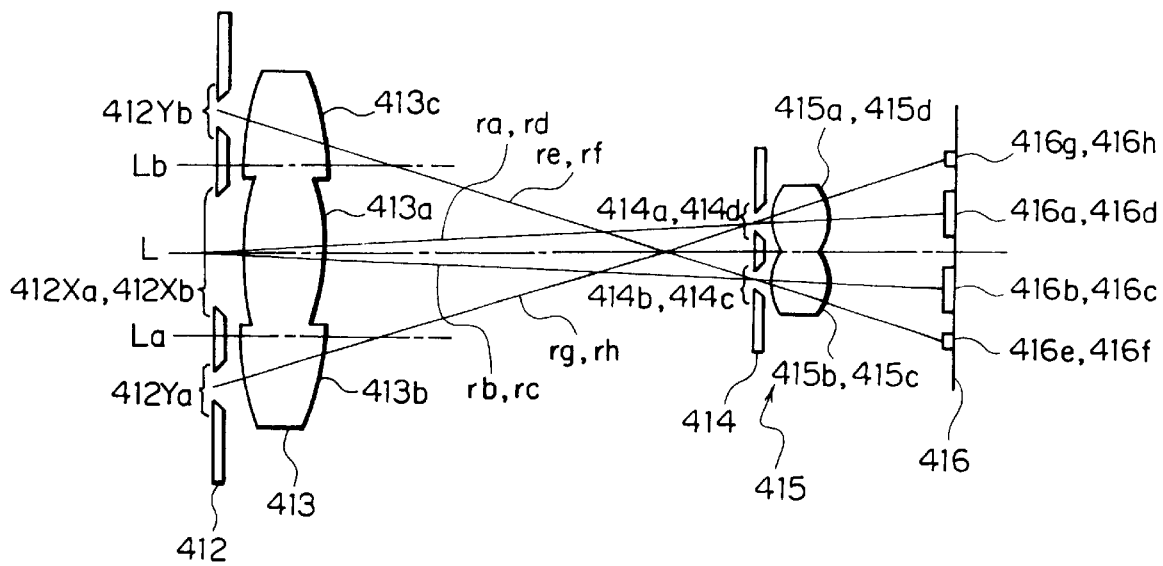
FIG. 7 is a schematic diagram of optical paths in the focal point detection apparatus shown in FIG. 6.
Figure 8:
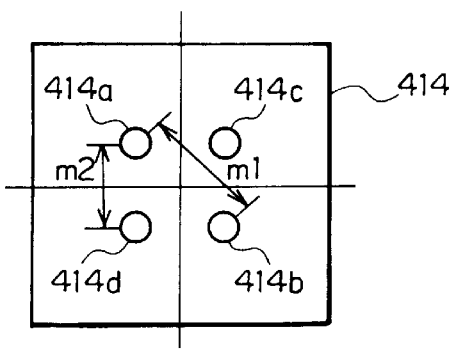
FIG. 8 is a front view for showing stop apertures of an aperture mask in the focal point detection apparatus according to the fourth embodiment of the present invention.

FIG. 6 is a perspective view for showing a schematic configuration of a focal point detection apparatus according to the fourth embodiment of the present invention. FIG. 7 is a schematic diagram of optical paths in the focal point detection apparatus 419 shown in FIG. 6, seen along the axis y. FIG. 8 is a front view of a stop aperture of an aperture mask, seen from the object side. A light flux from the object field is imaged in the vicinity of a view field mask 412 through an unrepresented photographing lens. This view field mask 412 comprises a plurality of view field apertures 412Xa, 412Xb, 412Ya and 412Yb. The view field apertures 412Xa, 412Xb are corresponding to a focal point detection area at the center of the photographing frame, while the view field apertures 412Ya, 412Yb are corresponding to a focal point detection area on the periphery of the photographing frame, respectively.

The view field apertures 412Xa and 412Xb cross at right angles with each other about the optical axis L, respectively having rectangular forms elongated along the axis x and the axis y, equidistantly. The view field apertures 412Ya and 412Yb respectively have rectangular forms elongated in the direction of the axis y about the axis x, equidistantly from the optical axis L.

Corresponding to the view field apertures 412Xa, 412Xb, 412Ya and 412Yb, the condenser lens 413 is integrally provided with lens units 413a, 413b, and 413c. The optical axis of the central lens unit 413a is corresponding to the optical axis L of the focal point detection apparatus. The lens units 413b and 413c of the condenser lens 413 are arranged, as shown in FIG. 7, such that their respective optical axes La and Lb are eccentric with respect to the view field apertures 412Ya and 412Yb, and the optical axes La, Lb of the lens units 413b, 413c are arranged to be parallel to the optical axis L of the lens unit 413a.

In the present embodiment, an aperture mask 414 and a re-imaging lens 415 at the back thereof are provided with four stop apertures 414a, 414b, 414c and 414d and corresponding four re-imaging lens units 415a, 415b, 415c and 415d, arranged in the same manner as in the second embodiment shown in FIG. 3. In a CCD chip 416, there are formed, for focal point detection at the central area of the photographing frame the light receiving element arrays 416a, 416b which are extended radially around the optical axis L along the view field aperture 412Xa and the light receiving element arrays 416c, 416d which are extended radially around the optical axis L along the view field aperture 412Xb. There are also formed two light receiving element arrays 416g, 416h and two light receiving element arrays 416e, 416f, respectively corresponding to the view field apertures 412Ya and 412Yb to be extended along in the direction of the axis Y, for focal point detection on the periphery of the photographing frame.

Out of light fluxes from the object field, a light flux passing the view field aperture 412Xa on the optical axis L of the photographing lens is, like chief rays ra, rb shown in FIG. 7, divided through the lens unit 413a, the stop apertures 414a, 414b of the aperture mask 414 disposed at positions substantially conjugate to the exit pupil of the photographing lens and the re-imaging lens units 415a, 415b of the re-imaging optical system 415, thereby forming images respectively on the light receiving element arrays 416a, 416b of the CCD chip 16. In the same manner, a light flux passing the view field aperture 412Xb is, like chief rays rc, rd shown in FIG. 7, divided through the lens unit 413a, and through the stop apertures 414c, 414d of the aperture mask 414 and the re-imaging lens units 415c, 415d of the re-imaging optical system 415, thereby forming images respectively on the light receiving element arrays 416c, 416d of the CCD chip 416.

Also, out of light fluxes from the object field, a light flux passing the view field aperture 412Ya which takes a rectangular form elongated along the axis y passes through the lens unit 413b, like chief rays rg, rh shown in FIG. 7, and is divided through the aperture stops 414a, 414b and the re-imaging lens units 415a, 415d, thereby forming images respectively on the light receiving element arrays 416g, 416h of the CCD chip 416. The stop aperture 414a and the re-imaging lens unit 415a are also used by the light flux passing through the view field aperture 412Xa, while the stop aperture 414d and the re-imaging lens unit 415d are also used by the light flux passing through the view field aperture 412Xb. That is, the stop aperture 414a and the re-imaging lens unit 415a are used in common by the light flux passing through the view field aperture 412Xa and the light flux passing through the view field aperture 412Ya, while the stop aperture 414d and the re-imaging lens unit 415d are used in common by the light flux passing through the view field aperture 412Xb and the light flux passing through the view field aperture 412Ya. In the same manner, a light flux passing the view field aperture 412Yb passes through the lens unit 413c, like chief rays re, rf shown in FIG. 7, and is divided through the aperture stops 414b, 414c and the re-imaging lens units 415b, 415c, thereby forming images respectively on the light receiving element arrays 416e, 416f of the CCD chip 416. The stop aperture 414b and the re-imaging lens unit 415b are also used by the light flux passing through the view field aperture 412Xb, and the stop aperture 414c and the re-imaging lens unit 415c are also used by the light flux passing through the view field aperture 412Xb. That is, the stop aperture 414b and the re-imaging lens unit 415b are used in common by the light flux passing through the view field aperture 412Xa and the light flux passing through the view field aperture 412Yb, while the stop aperture 414c and the re-imaging lens unit 415c are used in common by the light flux passing through the view field aperture 412Xb and the light flux passing through the view field aperture 412Yb.

In the present embodiment, as shown in FIG. 8, a distance m1 between the paired apertures stops 414a and 414b of the view field aperture 412Xa is set to be wider than a distance m2 between the paired stop apertures 414a and 414d of the view field aperture 412Ya corresponding to a focal point detection area on the periphery of the photographing frame. The distance m2 corresponding to the focal point detection area on the periphery of the photographing frame is determined taking into consideration that there is no influence of the vignetting of the photographing lens. On the other hand, since the focal point detection area at the center of the photographing frame is not easily affected by the vignetting, the original precision in focal point detection can be fully attained when the distance m1 which is corresponding to the focal point detection area is set to be wider than the distance m2. Therefore, in the focal point detection apparatus having a plurality of focal point detection areas, even if a stop aperture is used in common by the plurality of focal point detection areas, the distance between paired stop apertures corresponding to a focal point detection area at the center of the photographing frame is not set to be narrow, unlike in the focal point detection apparatus disclosed in the Japanese Patent No. 2663657, so that focal point detection can be performed with high precision in any of the focal point detection areas.

Also in the present embodiment, since the stop apertures of the aperture mask 414 and the re-imaging lens units of the re-imaging optical system 415 are used in common, only four stop apertures of the aperture mask 414 and four re-imaging lens units of the re-imaging optical system 415 are required, which is the number smaller than that of the view field apertures of the view field mask 412, whereby the focal point detection apparatus can be constituted in a simple structure. Further, all the radiuses of curvature of the lens units can be set to be equal to each other, a condenser lens with a simpler structure may be employed.

According to the present embodiment, some of the paired aperture stops respectively corresponding to at least two of the plurality of focal point detection areas are used in common, and the distance between the paired stop apertures corresponding to a first focal point detection area is set to be wider than the distance between the paired stop apertures corresponding to a second focal point detection area which is separated from the optical axis of the photographing lens farther, compared with the first focal point detection area. Accordingly, since the structure of the focal point detection apparatus is simplified and the optical system is constituted without deterioration of the precision in focal detection at the first focal point detection area which is a focal point detection area in the vicinity of the photographing frame, it is possible to perform focal point detection with high precision.

Figure 9:
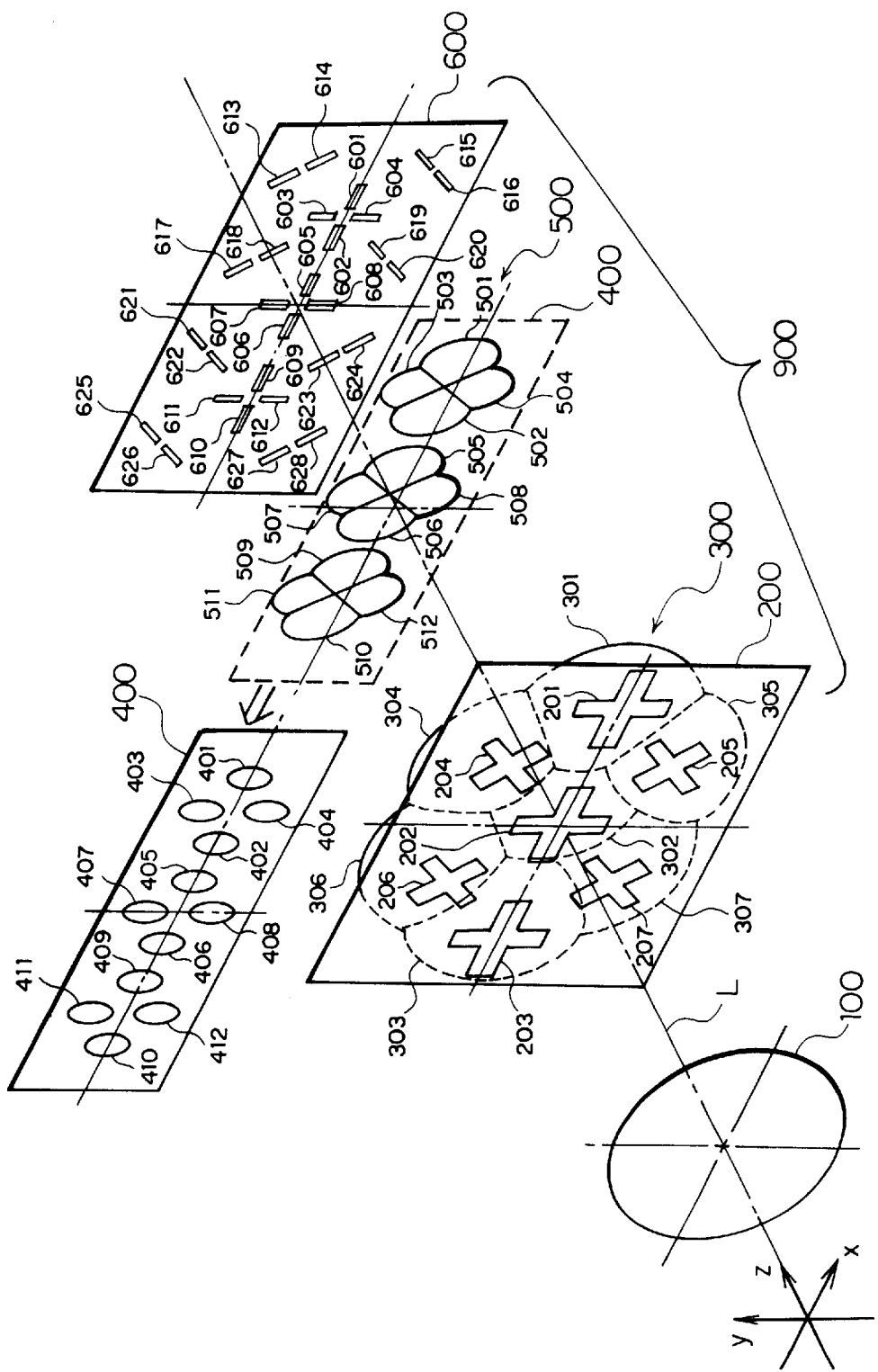
FIG. 9 is a perspective view for showing a schematic configuration of a focal point detection apparatus according to a fifth embodiment of the present invention.
Figure 10:
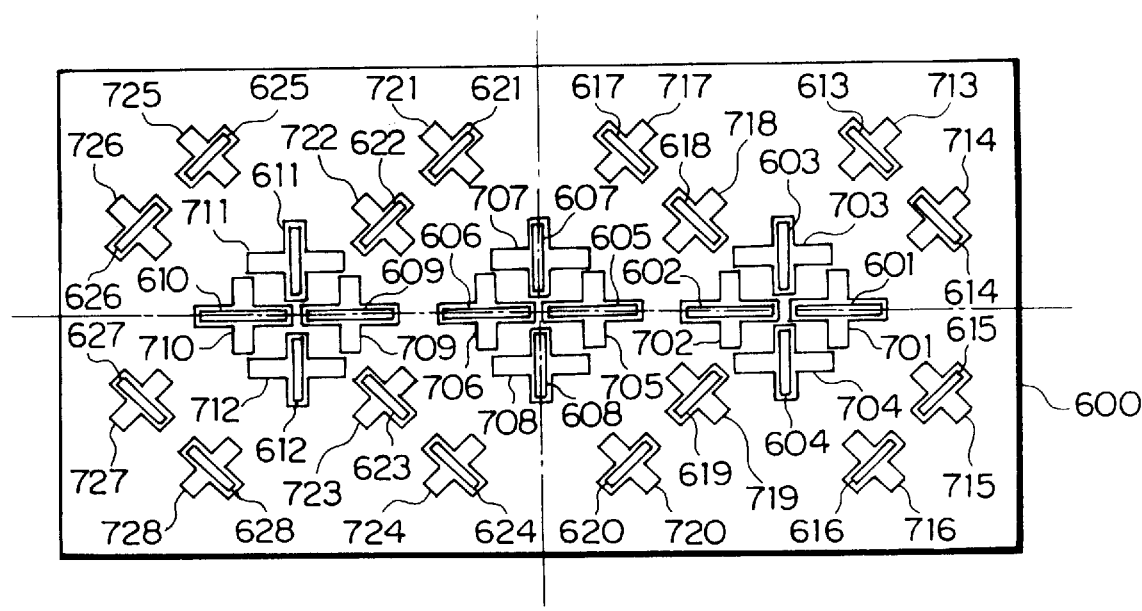
FIG. 10 is a front view for showing a CCD chip in the focal point detection apparatus according to the fifth embodiment of the present invention.

FIG. 9 is a perspective view for showing a schematic configuration of a focal point detection apparatus according to the fifth embodiment of the present invention. FIG. 10 is a front view of a CCD chip according to the fifth embodiment, seen from the object side. A light flux from the object field is imaged in the vicinity of a view field mask 200 through a photographing lens 100. This view field mask 200 has a plurality of view field apertures 201, 202, 203, 204, 205, 206, and 207, each having a cross shape. The view field aperture 202 is corresponding to a focal point detection area at the center of a photographing frame, with the center thereof on the optical axis L of the focal point detection optical system, and is elongated along the axis x and the axis y, while the view field apertures 201 and 203 are corresponding to focal point detection areas at positions equidistantly out of the optical axis L of the photographing lens 100 and are elongated along the axis x and in the direction of the axis y. The view field apertures 204, 205, 206 and 207 are corresponding to focal point detection areas at positions out of a line for connecting the centers of at least two focal point detection areas of the focal point detection areas corresponding to the view field apertures 201, 202, and 203.

One rectangular portion of each cross-shaped view field aperture is elongated in a radial direction about the optical axis L, while the other rectangular portion is elongated perpendicularly to the radial direction.

The condenser lens 300 integrally comprises seven lens units 301, 302, 303, 304, 305, 306 and 307 respectively corresponding to the view field apertures 201, 202, 203, 204, 205, 206 and 207. The optical axis of the lens unit 302 which is corresponding to the view field aperture 202 on the optical axis is aligned with the optical axis L of the focal point detection optical system. An aperture mask 400 which is disposed at a position substantially conjugate with the exit pupil of the photographing lens 100 at the back of the view field aperture 202 and the condenser lens 300 is provided with three groups of respectively two pairs of stop apertures 401, 402, 403 and 404; 405, 406, 407 and 408; and 409, 410, 411 and 412, correspondingly to the view field apertures 201, 202 and 203. A re-imaging lens 500 comprises three groups of respectively two pairs of lens units 501, 502, 503 and 504; 505, 506, 507 and 508; and 509, 510, 511 and 512, correspondingly to these three groups of the stop apertures 401, 402, 403 and 404; 405, 406, 407 and 408; and 409, 410, 411 and 412.

Images transmitting through the view field apertures 201, 202 and 203 will be described fully in the following. Out of light fluxes from the object field, a light flux passing through a rectangular aperture portion of the view field aperture 202 extended along the axis x passes through the lens unit 302 of the condenser lens 300 and is divided through the stop apertures 405, 406 of the aperture mask 400 disposed at a position substantially conjugate with the exit pupil of the photographing lens 100 and the re-imaging lens units 505, 506 of the re-imaging optical system 500, thereby forming images respectively on light receiving element arrays 605, 606 of a CCD chip 600. A light flux passing through a rectangular aperture portion of the view field aperture 202 extended along the axis y passes through the lens unit 302 of the condenser lens 300 and is divided through the stop apertures 407, 408 of the aperture mask 400 disposed at the position substantially conjugate with the exit pupil of the photographing lens 100 and the re-imaging lens units 507, 508 of the re-imaging optical system 500, thereby forming images respectively on light receiving element arrays 607, 608 of the CCD chip 600.

Out of light fluxes from the object field, a light flux passing through a rectangular aperture portion of the view field aperture 201 extended along the axis x passes through the lens unit 301 of the condenser lens 300 and is divided through the stop apertures 401, 402 of the aperture mask 400 disposed at the position substantially conjugate with the exit pupil of the photographing lens 100 and the re-imaging lens units 501, 502 of the re-imaging optical system 500, thereby forming images respectively on light receiving element arrays 601, 602 of the CCD chip 600. A light flux passing through a rectangular aperture portion of the view field aperture 201 extended in the direction of the axis y passes through the lens unit 301 of the condenser lens 300 and is divided through the stop apertures 403, 404 of the aperture mask 400 disposed at the position substantially conjugate with the exit pupil of the photographing lens 100 and the re-imaging lens units 503, 504 of the re-imaging optical system 500, thereby forming images respectively on light receiving element arrays 603, 604 of the CCD chip 600.

Further, out of light fluxes from the object field, a light flux passing through a rectangular aperture portion of the view field aperture 203 extended along the axis x passes through the lens unit 303 of the condenser lens 300 and is divided through the stop apertures 409, 410 of the aperture mask 400 disposed at the position substantially conjugate with the exit pupil of the photographing lens 100 and the re-imaging lens units 509, 510 of the re-imaging optical system 500, thereby forming images respectively on light receiving element arrays 609, 610 of the CCD chip 600. A light flux passing through a rectangular aperture portion of the view field aperture 201 extended in the direction of the axis y passes through the lens unit 303 of the condenser lens 300 and is divided through the stop apertures 411, 412 of the aperture mask 400 disposed at the position substantially conjugate with the exit pupil of the photographing lens 100 and the re-imaging lens units 511, 512 of the re-imaging optical system 500, thereby forming images respectively on light receiving element arrays 611, 612 of the CCD chip 600.

As described above, the focal point detection areas corresponding to the view field apertures 201, 202 and 203 respectively use two pairs (because each the view field apertures is cross-shaped) of the stop apertures 401, 402, 403, 404, 405, 406, 407, 408, 409, 410, 411, and 412, and the re-imaging lens units 501, 502, 503, 504, 505, 506, 507, 508, 509, 510, 511, and 512.

Images transmitting through the view field apertures 204, 205, 206 and 207 will be fully described in the following. Out of light fluxes from the object field, a light flux passing through a rectangular aperture portion of the view field aperture 204 extended perpendicularly to the radial direction about the optical axis L of the photographing 100 passes through the lens unit 304 of the condenser lens 300 and is divided through the stop apertures 406 and 408 which are corresponding to the view field aperture 202 of the aperture mask 400 disposed at the position substantially conjugate with the exit pupil of the photographing lens 100 and the re-imaging lens units 506, 508 which are corresponding to the view field aperture 202 of the re-imaging optical system 500, thereby forming images respectively on light receiving element arrays 623, 624 of the CCD chip 600. A light flux passing through a rectangular aperture portion of the view field aperture 204 extended radially about the optical axis L of the photographing lens 100 passes through the lens unit 304 of the condenser lens 300 and is divided by the stop apertures 401, 402 corresponding to the view field aperture 201 which is different from the view field aperture 202 of the aperture mask 400 disposed at the position substantially conjugate with the exit pupil of the photographing lens 100 and the re-imaging lens units 501, 502 corresponding to the view field aperture 201 which is different from the view field aperture 202 of the re-imaging optical system 500, thereby forming images respectively on light receiving element arrays 615, 616 of the CCD chip 600.

Also, out of light fluxes from an object field, a light flux passing through a rectangular aperture portion of the view field aperture 205 extended perpendicularly to the radial direction about the optical axis L of the photographing lens 100 passes through the lens unit 305 of the condenser lens 300 and is divided through the stop apertures 406, 407 which are corresponding to the view field aperture 202 of the aperture mask 400 disposed at the position substantially conjugate with the exit pupil of the photographing lens 100 and the re-imaging lens units 506, 507 which are corresponding to the view field aperture 202 of the re-imaging optical system 500, thereby forming images respectively on light receiving element arrays 621, 622 of the CCD chip 600. A light flux passing through a rectangular aperture portion of the view field aperture 205 extended radially about the optical axis L of the photographing lens 100 passes through the lens unit 305 of the condenser lens 300 and is divided through the stop apertures 401, 403 corresponding to the view field aperture 201 which is different from the view field aperture 202 of the aperture mask 400 disposed at the position substantially conjugate with the exit pupil of the photographing lens 100 and the re-imaging lens units 501, 503 corresponding to the view field aperture 201 which is different from the view field aperture 202 of the re-imaging optical system 500, thereby forming images respectively on light receiving element arrays 613, 614 of the CCD chip 600.

Further, out of light fluxes from the object field, a light flux passing through a rectangular aperture portion of the view field aperture 206 extended perpendicularly to the radial direction about the optical axis L of the photographing 100 passes the lens unit 306 of the condenser lens 300 and is divided through the stop apertures 405, 408 which are corresponding to the view field aperture 202 of the aperture mask 400 disposed at the position substantially conjugate with the exit pupil of the photographing lens 100 and the re-imaging lens units 505, 508 which are corresponding to the view field aperture 202 of the re-imaging optical system 500, thereby forming images respectively on light receiving element arrays 619, 620 of the CCD chip 600. A light flux passing through a rectangular aperture portion of the view field aperture 206 extended radially about the optical axis L of the photographing lens 100 passes through the lens unit 306 of the condenser lens 300 and is divided through the stop apertures 410, 412 corresponding to the view field aperture 203 which is different from the view field aperture 202 of the aperture mask 400 disposed at the position substantially conjugate with the exit pupil of the photographing lens 300 and the re-imaging lens units 510, 512 corresponding to the view field aperture 203 which is different from the view field aperture 202 of the re-imaging optical system 500, thereby forming images respectively on light receiving element arrays 627, 628 of the CCD chip 600.

Still further, out of light fluxes from the object field, a light flux passing through a rectangular aperture portion of the view field aperture 207 extended perpendicularly to the radial direction about the optical axis L of the photographing 100 passes through the lens unit 307 of the condenser lens 300 and is divided through the stop apertures 405, 407 which are corresponding to the view field aperture 202 of the aperture mask 400 disposed at the position substantially conjugate with the exit pupil of the photographing lens 100 and the re-imaging lens units 505, 507 which are corresponding to the view field aperture 202 of the re-imaging optical system 500, thereby forming images respectively on light receiving element arrays 617, 618 of the CCD chip 600. A light flux passing through a rectangular aperture portion of the view field aperture 207 extended radially about the optical axis L of the photographing lens 100 passes through the lens unit 307 of the condenser lens 300 and is divided through the stop apertures 410, 411 corresponding to the view field aperture 203 which is different from the view field aperture 202 of the aperture mask 400 disposed at the position substantially conjugate with the exit pupil of the photographing lens 100 and the re-imaging lens units 510, 511 corresponding to the view field aperture 203 which is different from the view field aperture 202 of the re-imaging optical system 500, thereby forming images respectively on light receiving element arrays 625, 626 of the CCD chip 600.

As described above, the light fluxes transmitting through the view field apertures 204, 205, 206 and 207 use the stop apertures and the re-imaging units corresponding to the focal point detection areas corresponding to the view field apertures 201, 202 and 203.

Relationship between the view field apertures and the view field aperture images will be described with reference to FIG. 10. The view field aperture 201 is corresponding to view field aperture images 701, 702, 703 and 704, the view field aperture 202 is corresponding to view field aperture images 705, 706, 707 and 708, the view field aperture 203 is corresponding to view field aperture images 709, 710, 711 and 712, the view field aperture 204 is corresponding to view field aperture images 715, 716, 723 and 724, the view field aperture 205 is corresponding to view field aperture images 613, 614, 721 and 722, the view field aperture 206 is corresponding to view field aperture images 719, 720, 727 and 728, and the view field aperture 207 is corresponding to view field aperture images 717, 718, 725 and 726, respectively.

In the above structure, the stop aperture 405 of the aperture mask 400 and the lens unit 505 of the re-imaging lens 500 are, for example, used in common by the view field apertures 202, 206 and 207 of the view field mask 200. That is, light fluxes from different view field apertures use the same stop apertures and re-imaging lens unit. Accordingly, the configuration of the focal point detection optical system can be largely simplified.

Also, with respect to a focal point detection area disposed at positions out of a line for connecting the centers of at least two focal point detection areas of the focal point detection areas corresponding to the view field apertures 201, 202 and 203, stop aperture and re-imaging lens unit for a light flux passing through a rectangular aperture portion of a cross-shaped view field aperture elongated in a radial direction about the optical axis L of the photographing lens 100 and stop aperture and re-imaging lens unit used for a light flux passing through a rectangular aperture portion of the same cross-shaped view field aperture, elongated perpendicularly to the radial direction, are different from each other among stop apertures and re-imaging lenses corresponding to the view field apertures 201, 202 and 203. As a result, it is possible to form cross-shaped focal point detection areas in all of the focal point detection areas, thereby conspicuously reducing the number of objects which are difficult to deal with in focal point detection.

As described above, according to the present embodiment, a focal point detection area having a cross-shaped view field aperture is set at a position out of a line connecting the centers of the first and second focal point detection areas which respectively use their own stop apertures and re-imaging lens units, a light flux transmitted through one rectangular view field aperture portion of the cross shape view field aperture uses the stop aperture and the re-imaging lens unit corresponding to the first focal point detection area, and a light flux transmitted through the other rectangular view field aperture portion of the same cross shape view field aperture uses a stop aperture and a re-imaging lens unit corresponding to the second focal point detection area. As a result, the constitutional elements of the focal point detection optical system can be largely simplified.

What is claimed is:

1. A focal point detection apparatus comprising:
   a view field mask disposed in the vicinity of a prearranged imaging plane of a photographing lens and provided with a plurality of view field apertures corresponding to a plurality of focal point detection areas;
   a condenser lens provided with a plurality of lens units to respectively condense light fluxes transmitted by said plurality of view field apertures of said view field mask; and
   a re-imaging optical system provided with a plurality of re-imaging lens units to divide a light flux transmitted by each of said plurality of view field apertures into a pair of light fluxes and to transmit said pairs of light fluxes to different areas of the exit pupil of said photographing lens and to form images of said plurality of view field apertures on a light receiving element,
      wherein said plurality of lens units are arranged such that the light fluxes transmitted by said plurality of view field apertures cross each other between said condenser lens and said re-imaging optical system.

2. A focal point detection apparatus comprising:
   a view field mask disposed in the vicinity of a prearranged imaging plane of a photographing lens and provided with a plurality of view field apertures corresponding to a plurality of focal point detection areas;
   a condenser lens provided with a plurality of lens units to respectively condense light fluxes transmitted by said plurality of view field apertures of said view field mask; and
   a re-imaging optical system provided with a plurality of re-imaging lens units to divide a light flux transmitted by each of said plurality of view field apertures into a pair of light fluxes and to transmit said pairs of light fluxes to different areas of the exit pupil of the photographing lens and to form images of said plurality of view field apertures on a light receiving element,
      wherein said detection apparatus further includes a deflection means for deflecting a traveling direction of said light flux, with said deflection means being disposed such that the light fluxes transmitted by said plurality of view field apertures cross each other between said condenser lens and said re-imaging optical system.

3. A focal point detection apparatus according to claim 1, wherein part of said plurality of re-imaging lens units corresponding to at least two of said plurality of focal point detection areas is used in common.

4. A focal point detection apparatus comprising:
   a view field mask disposed in the vicinity of a prearranged imaging plane of a photographing lens and provided with a plurality of view field apertures corresponding to a plurality of focal point detection areas;
   a condenser lens provided with a plurality of lens units to respectively condense light fluxes transmitted by said plurality of view field apertures of said view field mask;
   an aperture mask provided with plural pairs of stop apertures to divide a light flux transmitted by said plurality of view field apertures into a pair of light fluxes to transmit said pair of light fluxes to different areas of the exit pupil of the photographing lens; and
   a re-imaging optical system provided with a plurality of re-imaging lens units to form images of said plurality of view field apertures on a light receiving element,
      wherein said paired stop apertures respectively corresponding to at least two focal point detection areas of said plurality of focal point detection areas use each other partly in common, at least said two focal point detection areas consist of at least first and second focal point detection areas having different distances from the optical axis of said photographing lens, and, when said second focal point detection area is separated from the optical axis of said photographing lens by more than said first focal point detection area, the gap between said paired stop apertures corresponding to said first focal point detection area is wider than the gap between said paired stop apertures corresponding to said second focal point detection area.

5. A focal point detection apparatus comprising:
   a view field mask disposed in the vicinity of a prearranged imaging plane of the photographing lens and provided with a plurality of view field apertures corresponding to first and second focal point detection areas;
   a condenser lens provided with a plurality of lens units to respectively condense light fluxes transmitted by said plurality of view field apertures of said view field mask;
   an aperture mask provided with a plurality of stop apertures to divide each of the light fluxes respectively transmitted by said plurality of view field apertures into a pair of light fluxes to transmit said pair of light fluxes to different areas of the exit pupil of said photographing lens; and
   a re-imaging optical system provided with a plurality of re-imaging lens units to form the images of said plurality of view field apertures on a light receiving element,
      wherein said focal point detection apparatus further includes a cross-shaped view field aperture to provide another focal point detection area, at a position out of a line connecting the centers of said first and second focal point detection areas to each other, and a light flux being transmitted by one rectangular view field aperture of the cross-shaped view field aperture uses the stop aperture and the re-imaging lens unit corresponding to said first focal point detection area, while a light flux being transmitted by the other rectangular view field aperture portion of said cross-shaped view field aperture uses the stop aperture and the re-imaging lens unit corresponding to said second focal point detection area.

6. A focal point detection apparatus according to claim 5, wherein each of said focal point detection apparatus has a cross-shaped view field aperture.

7. A focal point detection apparatus according to claim 2, wherein part of said plurality of re-imaging lens units corresponding to at least two of said plurality of focal point detection areas is used in common.

* * * * *